Patented July 4, 1950

2,513,416

UNITED STATES PATENT OFFICE 2,513,416

ALGINOUS GUM PRODUCT AND THE MANUFACTURE THEREOF

Victor Charles Emile Le Gloahec, Rockland, Maine, assignor to the Algin Corporation of America, New York, N. Y., a corporation of Delaware No Drawing. Application August 2, 1944, Serial No. 547,818

23 Claims. (Cl. 18—54)

This invention relates to new alginous products and the manufacture thereof. It relates particularly to the manufacture of products of interaction between algin and certain vegetable gums and to the formation of metalorganic compounds with such products.

Algin is a complex organic substance contained in various seaweeds such as Laminaria, Phaeophyceae, Macrocystis, Nereocystis and the like. Algin may be recovered from seaweed in several different ways and may, for example, be recovered in a high state of purity according to the method described in Patent No. 2,128,551, applied for by the applicant jointly with John Robert Herter. Algin is also referred to as alginous material. Pure algin is soluble in distilled water but is precipitated if sufficient acid is added to an algin solution. By adding an alkali, precipitated algin can be dissolved. Due to this fact algin is sometimes referred to as insoluble alginic acid and soluble alginate, but as a result of my research in connection with algin, I do not regard this nomenclature as apt in connection with a material such as algin which behaves as a colloid that is insoluble below its isoelectric point and is soluble above its isoelectric point. For this reason, I will refer herein to the material in question by the term "algin," which is the term most generally used in the art. Algin is used extensively for a variety of purposes such as a stabilizer, sizing material, etc., and is a well known article of commerce. It is preferable that algin be used according to this invention in its natural polymerized condition, e. g., as recovered according to said Patent No. 2,128,551.

It is a purpose of this invention to provide new alginous products which, as compared with algin by itself, have higher viscosity characteristics in water dispersion, are more readily dispersible in water, are less susceptible to deteriorating influences due to either physical or chemical causes, and which can be converted into extremely insoluble metalorganic compounds.

While algin is widely used for a number of commercial purposes there are certain inherent properties of algin which are of considerable disadvantage and detract from its utility. Thus it is well known that when algin, particularly if in powdered form, is placed in contact with an aqueous medium for dispersion therein, it immediately forms into lumps as a result of the practically instantaneous swelling of an exterior membrane which resists further penetration of the solvent medium and greatly retards the establishment of equilibrium between internal and external osmotic pressures whereby the algin may go into solution. This drawback can be alleviated by resort to turbulent agitation, but employment of turbulent agitation may not be available or may not be appropriate under many circumstances.

Another inherent disadvantage of algin is its sensitivity to certain chemical reagents such as concentrated salt solutions, traces of metallic or alkaline earth salts in solution, or acidic aqueous media, all of which, according to their concentration, tend to act as gelling or coagulating agents. Due to the extreme sensitivity of algin to such chemical agents, the field of utility of algin is correspondingly reduced and, if possible, special steps have to be taken to guard against or avoid the occurrence of any such undesirable reactions.

It is also well known that algin when in solution has the disadvantage of being sensitive to temperature in that upon elevation of temperature there is a degradation of the algin and a loss of its distinctive property of imparting high viscosity to aqueous solutions. For example, a 1% water solution of pure algin will ordinarily have a viscosity at 20° C. of about 1,500 centipoises, and if such a solution is heated to 100° C., kept at this temperature for 20 minutes, and then cooled and tested for viscosity, it will be found that the viscosity at 20° C. has dropped to between 800 and 900 centipoises. The decrease in viscosity is in direct relation to the length of time that the algin solution is subjected to the elevated temperature. The usefulness of algin at temperatures above normal atmospheric temperature is therefore extremely limited.

A lessening of the capacity to increase the viscosity of aqueous media, also results from subjecting algin to a medium of reduced pH. In other words, in an acidic medium, and depending upon the acidity of the medium and the duration of exposure to the medium, there is hydrolysis and degradation of the algin which results in a lessening of the capacity of the algin to impart high viscosity to aqueous media.

It is a feature of this invention that alginic products are afforded which have the commercially valuable properties of ordinary algin, but have additional advantages. Thus, according to this invention, alginic products can be prepared which have a somewhat higher viscosity in aqueous solution as compared with algin for equal concentrations, which are much more readily dispersed in aqueous media as compared with algin, which are of improved stability and resistance to loss of viscosity when subjected to heat, which are of improved stability and resistance to loss of viscosity when subjected to acidic media, and which are of improved resistance to coagulation under the influence of coagulants including acids and ionizable compounds of metals that have an insolubilizing action on algin.

As aforesaid, it is known that algin is sensitive to certain ionizable compounds of metals which tend to form insoluble alginates. For most purposes formation of such insoluble alginates is undesirable since the particles of coagulation do not have the viscosity increasing characteristics of algin and constitute undesirable particulate material. If, on the other hand, attempt is made to utilize the property of algin in forming insoluble metal alginates for waterproofing purposes, the result is unsatisfactory since the metal alginate lacks sufficient stability to resist its being retransformed to soluble algin. Thus, for example, if a fabric is treated with an algin solution and thereafter is treated with a soluble calcium salt to form calcium alginate in situ as a waterproofing for the fabric, the calcium of the calcium alginate can, by successive washings with water, or, more rapidly, by dialysis or contact with an acidic medium, be eliminated to such extent that, upon subsequent contact with mild alkali such as is present in ordinary alkaline detergents, a soluble alkaline alginate is produced which is removable from the fabric. Due to this lack of stability the so-called insoluble metallic alginates have not been found to be satisfactory for waterproofing.

It is one of the features of this invention that metal compounds of alginic products are afforded which not only are water-insoluble but also are extremely stable and are resistant to the influences which solubilize corresponding metal compounds of algin.

I have found that if algin is coagulated by contact with an acidic medium at a pH below the isoelectric point of the algin, and the algin coagulum is commingled with a solution of a water-soluble vegetable gum that is insoluble in alcohol, there is an interaction between the algin and the gum with the production of a product of interaction, which I refer to herein and in the claims, as algino-gum, the properties of the algino-gum being markedly different from the properties either of algin by itself or of a mere mixture of algin with a gum.

In order to afford a better understanding of this invention, it may be illustrated in connection with the following typical example of preferred practice thereof, whereby an algino-gum product is prepared by interaction between algin and Irish moss.

Irish moss, which is a vegetable gum of the galactan type, is first ground to a finely-divided condition, preferably, so as to pass a 100 mesh standard testing sieve. About 1½ parts of the finely-divided Irish moss is then dispersed in 100 parts of water. This mixture is brought to the boiling point and held at this temperature during the time required for breaking up of the cellulose fibers and for putting the gum into solution, which requires approximately three hours. The solution may be filtered or not, depending upon whether or not the final product is intended to contain, or be free of, the cellulose residue. The filtration can be effected in any suitable way, of which several are well known, and if desired the filtration can be assisted by the use of any suitable type of "filter aid" material. The gum solution can, if desired, by deodorized and bleached by well known methods, as by employment of activated carbon, or such steps can be dispensed with depending upon the final product desired. These steps merely involve purification of the solution and do not bear upon the essential characteristics of the ultimate product or its formation, but merely have to do with the degree of transparency, color, and odor that may be regarded as suitable.

There is also prepared an algin coagulum. This may be done by dissolving pure algin such as that produced according to the above mentioned Patent No. 2,128,551, to form a solution containing about 0.5% by weight of algin and gradually adding hydrochloric acid until the pH of the aqueous medium is about 2, the algin becoming coagulated when the pH of the medium is carried below the isoelectric point of the algin.

After the solution of the gum has been cooled to approximately atmospheric temperature, it is put into a tank provided with a mechanical agitator, and the acidic algin coagulum is commingled with the gum solution, the amount of algin coagulum added being such that the dry weight of algin in the resulting mixture will be substantially the same as the dry weight of the gum. The entire mass is then agitated until the mass becomes converted to a homogeneous jelly-like consistency, indicating that the interaction between the algin and the gum has become substantially completed. This usually requires about twenty minutes, and during this period the algino-gum product is formed. In order to minimize any hydrolysis which might be induced by prolonged contact with the acidic aqueous medium, the medium is deacidified after the product has been formed as by slowly adding an alkali until the pH of the mass is about 7.

By the above procedure the algino-gum product is formed in an aqueous medium of jelly-like consistency or viscous syrup and the product can, if desired, be employed in this condition. For commercial marketing, however, it is normally desirable to reduce the algino-gum product to the form of a finely-divided powder. This can preferably be accomplished by resort to the following procedure according to this invention.

I have found that the solution of algino-gum can advantageously be reduced to a dry, powdered condition by forcing the solution through an orifice into an alcohol solution of sufficient concentration to coagulate the algino-gum product. The alcohol solution should be maintained of such concentration that the titre at 20° C. of the alcohol solution at the time of coagulation is not less than 45%. For purposes of illustration the alcohol used may be isopropanol. In practice for large scale operation, the algino-gum solution is forced simultaneously through a considerable number of spinnerette orifices into the alcohol bath. The result is a multiplicity of filaments of the coagulated algino-gum product which may be separated from the alcoholic coagulating medium by any suitable means such as drainage of the alcoholic medium through screens or cloths, filtration, by employment of vibrating screens, as may be desired, according to known methods for conducting such a separation. During this operation the filamentary coagulum may become broken up to a more finely-divided particulate form but the coagulum remains in the form of a porous mass that can readily be separated from the coagulating liquid, washed and dried. If desired, the filamentary or particulate material may be subjected to further washing as with isopropanol in successive washings which may desirably be with solutions of isopropanol of 65%, 75% and 85% concentration, the alcohol being separated from the coagulum after each washing. The purpose of these further washings is to eliminate the majority of the salts, which for certain purposes may be undesirable, and is likewise to eliminate water so that subsequent drying is facilitated. The resulting material after washing is vacuum dried and ground to a powder.

The powdered algino-gum product has new and distinctive properties, both as to its capacity to go into solution and as to its properties when dispersed in solution. Upon introducing the powdered algino-gum product in water, the particles are very readily dispersed without formation of any lumps or agglomerates of particles which is an objectionable but characteristic property of algin in powdered form. The new algino-gum product in powdered form upon distribution in water becomes wetted and dispersed as easily as small grains of sand. After the particles have been dispersed in water, they swell and tend to form a homogeneous gel. This is followed by a third phase when the gel dissolves, leaving a viscous solution which is clear and homogeneous.

A solution of the new algino-gum product is of extremely high viscosity. A 1% solution of the product at a temperature of 20° C. has a viscosity to 1800 to 3000 centipoises. By comparison, it requires, depending upon the quality of the algin, about a 1.5% to 3% solution of algin to afford a solution of like viscosity.

Solutions of the new algino-gum product are likewise much less susceptible to chemical and physical influences as compared with algin. The pH of coagulation of the new algino-gum product is around one whereas the pH of coagulation of algin is around 3, which results in the fact that the pH of an aqueous medium containing the new algino-gum product can be lowered through a much wider range than algin solutions without gel formation and without coagulation. Moreover, the tendency to lose viscosity imparting properties that is induced by acidic conditions in the case of algin is much less in the case of the new algino-gum product. This is likewise the case with regard to the influence of heat in tending to reduce viscosity imparting properties.

Another advantageous property of the algino-gum product is its resistance to coagulation in the presence of small quantities of ionizible metal compounds that tend to coagulate algin. This may be illustrated in connection with products in which algin is useful as a stabilizer. Milk normally contains small quantities of dissolved calcium salts, and if algin is added directly to a milk product the calcium in the milk tends to precipitate the algin and render it ineffective as a stabilizer. The new algino-gum product of this invention does not have this disadvantage and can be added directly to a milk product without coagulation and without impairment of its stabilizing and viscosity increasing properties.

The advantages and properties of the new algino-gum product of this invention cannot be obtained by merely mixing a vegetable gum such as Irish moss with algin. It has heretofore been proposed to incorporate both a gum such as Irish moss and algin in various compositions. However, this simple mechanical blending of a gum such as Irish moss with algin does not afford results that are in any way comparable or analogous to the results that are obtainable with the new algino-gum product. This may be specifically illustrated as follows:

In the above-described example of this invention, I have described the production of an algin coagulum formed by coagulation of an algin solution of about 0.5% concentration. If, however, instead of causing the algin coagulum and Irish moss gum to interact in an aqueous medium at a pH below the isoelectric point of algin, the algin coagulum is merely washed by means of alcohol and the residual acidity is neutralized by an alkali so as to afford an algin product having a pH of about 7 as described in the above-mentioned Patent No. 2,128,551, one then obtains a soluble algin which is of the character of ordinary algin as available in the market. In this connection, it may be mentioned that algin is produced for the market for forming viscous aqueous solutions that are either substantially neutral or are slightly on the alkaline side in order that the algin may be water-soluble. If this ordinary dry algin powder is mixed with finely-divided Irish moss so that the algin and Irish moss are in essentially equal proportions by dry weight, namely, in the same relative proportions above mentioned in describing the typical example of the practice of this invention, the result is a mere mechanical mixture or blend of algin and Irish moss at a pH of about 7, namely, at essentially the same pH as the pH of the final algino-gum product produced according to the above described example of the practice of this invention.

When the new algino-gum product of this invention and the mechanical mixture of algin and Irish moss are compared as to properties, it is seen that they are wholly unlike. Thus, if equal quantities of the new algino-gum product and of the blend of algin plus Irish moss are mixed with water at room temperature the behavior is entirely different. The mere blend of algin plus Irish moss exhibits the phenomena of lumping and agglomeration of particles which make solution in water difficult and which are characteristic of algin. On the other hand, the new algino-gum product of this invention has the property of quick dispersion and easy solution that has been commented upon above.

In testing the viscosities of water solutions of the two products it will be found that they are very different. As above stated, the viscosity of a 1% solution of the new product at ordinary atmospheric temperatures is of the order of 1800 to 3000 centipoises and is developed merely upon effecting the solution. On the other hand, a solution of like concentration utilizing the mechanical blend of powdered algin and Irish moss has a viscosity of the order of only 300 to 600 centipoises at atmospheric temperature. If the solution of mechanically blended algin and Irish moss is boiled, the viscosity of the Irish moss gum can be more fully developed but at best the viscosity of the solution of mechanically mixed algin plus Irish moss cannot be made greater than about 800 to 1400 centipoises at atmospheric temperature which is much less than the viscosity of a solution of like concentration utilizing the new algino-gum product of this invention.

In addition to the above, a mere mechanical blend of algin and Irish moss exhibits the same low resistivity to physical and chemical influences that is characteristic of pure algin, and this is to be expected since the algin occurs in its natural free condition and is affected in the same way and to the same extent as if the Irish moss or other gum merely blended mechanically therewith were not present.

The new algino-gum product that is formed by interaction between algin below its isoelectric point and a water soluble alcohol-insoluble vegetable gum, has the properties and characteristics of a new compound. Thus the fact that the algino-gum product exhibits a much higher viscosity in aqueous solution as compared with a mere mechanical mixture of algin and Irish moss, indicates that there is an enlargement of the colloidal particle as compared with either algin or with gum. The formation of a new compound is also indicated by the behavior of the new algino-gum product in the presence of acidic media. Thus a gum such as Irish moss is perfectly soluble in an acid aqueous medium of a pH of around 1.5 and even lower. However, when the new algino-gum product is coagulated by lowering the pH until coagulation is effected, the algino-gum forms a stable coagulum without exudation of the gum into the syneretical liquid, thus showing that there is no mere mechanical mixture of algin with gum but that the algin and gum have become unified by interaction as a new compound having chemical characteristics similar to algin, but superior to algin in the several respects that have been pointed out above.

The precise nature of the action that takes place betwen algin at a pH below its isoelectric point and a vegetable gum such as Irish moss is not fully understood. The interaction may be chemical or it may be in the nature of an adsorption phenomenon by affinities between the compounds with resultant formation of new stable colloidal particles. In any event, the new product results in the formation of unified stable colloidal particles and is a definite new product having characteristic properties and behavior which distinguish it from other known products or compositions.

The process above described is a general one and is applicable to the interaction of algin with any vegetable gum that is soluble in either cold or hot water and that is insoluble in alcohol. Such gums are of the chemical variety of the pentoses and hexoses groups, particularly arabans, ceresins, bassorins, and arabino-galactans, all of which by oxidation will produce mucic and/or oxalic acid. Examples of arabans are gum acacia, Senegal gum, cap gum, Indian gums, Feronia gum, etc. Examples of ceresins are gums from fruit trees such as cherry, plum, peach, etc. Examples of bassorins are gum tragacanth, bassorah gum, etc. Mucilagenous gums of marine algae which by slow acid hydrolysis produce galactose or arabinose are also suitable and are exemplified by the species floridae (chondrus crispus, gelidium, gracilaria, etc.).

In connection with the foregoing it may be mentioned that with some vegetable gums there is a certain amount of difficulty in obtaining good aqueous solutions of desired concentration, due to the fact that these gums tend to swell rather than dissolve. This may interfere with the preparation of solutions of the gums for subsequent interaction with acidic algin coagulum and in obtaining a homogeneous algino-gum compound. However, there are methods well known to persons familiar with this art whereby partial depolymerization of these gums may be effected as by high temperature cooking under pressure, slight oxidation by agents such as peroxide, etc., which permit the preparation of homogeneous viscous solutions, and such gums or modified gums are to be regarded as water-soluble vegetable gums.

In order to bring about the interaction between the algin and the gum to form the new algino-gum product, the algin should be dispersed as a coagulum in an aqueous medium at a pH below the isoelectric point of the algin. The isoelectric point of algin is normally at a pH of about 3. It is usually preferable to effect the interaction in a medium at a pH between about 1.5 and about 2.5. At such pH, the algin coagulum carries a plus charge and there is development of more adsorptive and reactive functions that have an affinity for the gum. In addition to hydrochloric acid, any acid may be employed which will lower the pH of the algin coagulum to the extent indicated. Mineral acids such as sulphuric, nitric, phosphoric and hydrofluoric are suitable. Organic acids such as acetic, citric, and formic which have a low pH may likewise be employed, but it is normally preferable to employ a mineral acid since a lesser quantity of acid has to be employed to achieve the desired low pH value. An algin solution that is coagulated by acid may be of any suitable concentration, but is preferably between 0.1 and 2% concentration.

The acidity of the aqueous medium, in which the interaction between the algin and the gum occurs, also tends to modify the gum due to a partial hydrolysis which appears to form a reactive group that acts as a liaison agent between the gum particles and the algin particles which results in their unification as stable colloidal particles of greater complexity. If desired, the gum solution can be acidified to effect this partial hydrolysis of the gum, prior to commingling of the gum with the acidic algin coagulum. However, partial hydrolysis of the gum inevitably occurs to some extent as a result of the commingling of the gum solution with the acidic algin coagulum even though the gum may not have been subjected to such partial hydrolysis prior to the commingling of the gum solution with the acidic algin coagulum.

It is preferable to cause the interaction between the gum and the acidic algin coagulum to take place at moderate temperatures such as ordinary atmospheric temperatures. It is possible, however, to cause such interaction to take place at fairly high temperatures, but high temperatures tend to result in some degradation of the gum and depolymerization of the algin so as to result in a product having lower viscosity and less stability.

The period during which the commingled algin and gum are maintained at a pH below the isoelectric point of the algin is preferably not substantially longer than is required to effect the desired interaction between the algin and the gum. This completion of the interaction is evidenced by the formation of a homogeneous viscous syrup or jelly or gel-like mass, which, as stated above, usually requires about twenty minutes. If the mass is subjected to the acidic medium for a longer period, the reaction does not proceed further, and under the influence of the acid there is some degradation of the algino-gum product, the extent of which depends upon how long the algino-gum is left in contact with the acid, with resulting lessening of the capacity of the algina-gum to produce solutions of high viscosity. Therefore, when it is desired to obtain an algino-gum product having a maximum capacity to produce aqueous solutions of high viscosity, the acidic medium in which the algino-gum is formed is deacidified as soon as the interaction between the algin and the gum has become completed. The medium should be deacidified, as by addition of an alkali thereto, until the algino-gum mass has a definite negative charge. Thus it is normally desirable that the algino-gum be deacidified until the pH of the medium in which it is contained is of the order of 4.5 or higher. When the mix is deacidified by an alkali, any suitable compound of an alkali metal (including ammonium) may be used which has an alkaline reaction, e. g., sodium hydroxide, sodium carbonate, sodium bicarbonate, potassium hydroxide, potassium carbonate, ammonium hydroxide, ammonium carbonate, aniline, triethanolamine, magnesium hydroxide, sodium metaborate, borax, sodium di or tri phosphate, lithium carbonate, lithium phosphate, etc.

After the algino-gum has been deacidified, the pH to which the product is adjusted may be varied and will depend upon the use for which the product is intended. Desirably this pH will be of the order of 4.5 to 9 but for most purposes it is preferable that the pH value of the product be between 6.5 and 8.5. The range of pH from 6.5 to 8.5 is best suited for most industrial applications, and it is likewise the range within which the final product appears to possess a maximum of physical and chemical stability, within which the property of quick dispersion in aqueous solutions is at a maximum, and within which the property of affording aqueous solutions of high viscosity is most pronounced.

In the above-described example of the practice of this invention, the algin and vegetable gum were mixed in substantially equal proportion by dry weight. The interaction between the algin and the gum will, however, take place when the proportions of these materials are varied quite widely. Thus of the total weight of the algin and gum, the gum can be varied between 10% and 70% by weight and the algin can be varied between 90% and 30% by weight. It is preferable, however, that the quantity of gum be of the range 25% to 50% by weight and that the algin be of the range 75% and 50% by weight. If the algin is in greater proportion than above indicated, the product is somewhat modified as compared with ordinary algin but the product is more sensitive to chemical reagents than when the algin and gum are caused to interact in the proportions above mentioned. On the other hand, when the gum is in greater proportions than those above indicated, the resulting product forms a jelly-like solution with a short break, these properties being desirable for certain purposes.

The algino-gum product being soluble in water above the coagulation point of acidity that has been mentioned, and as formed by the interaction of the algin and gum at a pH below the isoelectric point of the algin and subsequent deacidification of the aqueous medium, occurs either as a solution, or paste or jelly-like mass of homogeneous consistency, the viscosity being in direct proportion to the concentration of the algino-gum. The algino-gum can be used in this dissolved condition, and in such condition possesses all the desired properties and characteristics of the product.

If it is desired to produce the algino-gum product in the form of a dry powder, so that it can be placed on the market in convenient form, the drying of the product should be accomplished with a minimum tendency to degradation and with retention of the high viscosity producing characteristics and stability of the algino-gum.

I have found that the best procedure for reducing the algino-gum product to a dry, finely-divided condition is to coagulate an aqueous solution of the algino-gum by means of alcohol and then dry the coagulum. Preferably, the coagulum is washed with alcohol after it has been coagulated to remove any dissolved salts and other soluble impurities and preferably the coagulum is dried at subatmospheric pressure so as to accelerate the drying while at the same time minimizing the exposure of the algino-gum product to heat. I have also found that the coagulation step can best be conducted by introducing an aqueous solution of the algino-gum in the form of fine filaments into a bath of alcohol of a concentration adapted to coagulate the algin gum, thereby producing the algino-gum in filamentary form so that it can be more readily washed and dried. By way of illustration, an orifice of the order of 1/30 inch in diameter, has been found to be very desirable.

For use in the coagulation of the algino-gum any suitable aliphatic alcohol may be employed that is miscible with water. Such alcohols generally are those containing one, two or three carbon atoms such as ethyl alcohol, methyl alcohol, n-propyl alcohol, and isopropyl alcohol. The water soluble ether alcohols such as Cellosolve, methylcellosolve, Carbitol, and butyl Carbitol may also be employed. When reference is made herein and in the claims to an alcohol-insoluble gum, insolubility in any of the alcohols referred to (including the ether alcohols) is intended. In order to effect the initial coagulation of the algino-gum product the titre of the alcohol should be of the order of 45% or higher. For subsequent washings, it is desirable that the concentration of the alcohol be still higher, for in this way the amount of moisture remaining in the washed algino-gum product is reduced to a minimum.

In drying the algino-gum a vacuum of 25 inches of mercury is desirable and it is preferable that a vacuum of 27 inches of mercury be maintained.

While the algino-gum product can be reduced to a dried condition in other ways, such other ways are normally less desirable. Thus, if attempt is made to dehydrate an aqueous paste of algino-gum by employment of a drum drier or by spray drying, or other conventional drying methods, the exposure of the product to heat in such methods results in degradation of the product, and for most commercial applications such degradation of the product should desirably be reduced to a minimum. Instead of drying the aqueous paste of algino-gum solution, the algino-gum can be coagulated by an electrolyte or by means of an acid. When an electrolyte is employed the resulting product tends to have a high ash content which is usually undesirable. If an electrolyte is employed as a coagulant, the resulting coagulum can be dried directly, or preferably, may be washed with alcohol before drying. While coagulation with acid and subsequent alcohol washing is helpful, the coagulum is difficult to dry and some degradation of the product is likely to occur during drying. While these alternatives for drying the algino-gum product are available when some degradation of the product can be tolerated or is not undesirable, the preferred method of drying that has been described above is normally the best practice and constitutes a special feature of this invention.

Further features of this invention relate to the water-insoluble metalorganic compounds of the algino-gum product. It has been mentioned above that a metalorganic compound, e. g., of calcium, can be formed by reaction of the algino-gum product with a dissolved metal compound and that the resulting metalorganic product is much more insoluble than compounds of algin with the corresponding metals. Moreover, it is extremely resistant to treatment with chemical reagents such as acids and alkalis. In other words, by reacting the algino-gum with an insolubilizing metal an essentially inert water-insoluble metalorganic compound is produced. This metalorganic compound can be produced in various predetermined dispositions such as film or sheet, as coating or per se, or as an impregnant, a filament or the like and is highly desirable for a number of commercial applications.

The formation of the metalorganic compound of the algino-gum product can be illustrated as follows. For example, if the algino-gum product in solution is applied to a surface as a coating, the resulting film is homogeneous and stronger than a film made from a solution of algin. The film, however, is lacking in desistance to water. If the film thereafter is contacted with a solution of a compound of a metal having an insolubilizing action, the material of the film immediately forms with the metal the water-insoluble and essentially inert metalorganic compound, which remains as a homogeneous, tough, and extremely stable film. By sheeting the algino-gum material such sheets can be insolubilized to various sheets or sheet-like materials. If the algino-gum solution is fed through a spinnerette orifice into a bath of the insolubilizing metal, the resulting filament will have the water-insoluble and substantially inert properties above mentioned. If a fabric or other bibulous material is contacted with a bath of the algino-gum product, very desirable finishing is afforded, and such finishing can be rendered water-insoluble and highly resistant to acids, alkalis, etc., by thereafter contacting the bibulous material with a bath of dissolved metal compound. The extent of the permanent waterproofing will depend upon the amount of the metal-organic product deposited on and in the fabric. The reaction is also suitable for the insolubilization or fixation of dyestuffs used in textile printing. The algino-gum is an excellent thickening agent for textile printing colors since a high viscosity can be obtained by using about 1% of algino-gum, whereas about 3% of algin or 6 to 50% of natural gums, depending on type, would be required to obtain an equivalent consistency. If the applied printing thickener is subsequently treated with an insolubilizing metal, the algino-gum film or sheet-like printed indicia can be converted into a water-insoluble and essentially inert material, this not being possible either in the use of algin by itself or in the case of the gum by itself.

The algino-gum will form insoluble metalorganic compounds with a large number of metals. Of particular utility in this regard are aluminum, barium, beryllium, bismuth, cadmium, calcium, chromium, cobalt, copper, gold, iron, lead, manganese, mercury, molybdenum, nickel, silver, strontium, thorium, tin, titanium, zinc. The alkaline earth metals, calcium, barium and strontium, are of particular practical utility.

For the purpose of brevity, the metals above mentioned are referred to herein and in the claims as "insolubilizing" metals. The insolubilizing metal should be contained in a compound which is appreciably soluble in water, so that there will be at least in slight degree an ionization of the metal and so that the metal will be reactive with the algino-gum product.

While algino-gum is more resistant than algin to formation of metalorganic compounds, the reaction of the algino-gum product occurs readily upon bringing a solution of a compound of an insolubilizing metal into contact with the algino-gum when the compound of the metal is present in more than very low concentration, and upon such contact the algino-gum is converted into the insoluble metalorganic compound in whatever disposition the algino-gum occurs, namely, whether the algino-gum is en masse, or in some special form such as a sheet, a coating, a filament or the like.

The virtually complete insolubility and essential inertness of the insoluble metalorganic compound was not to be expected in view of the fact that corresponding metal compounds of algin lack such complete insolubility and inertness, and further in view of the fact that the vegetable gums remain in solution in the presence of the metal compounds that cause the insolubilization of the algino-gum. It is thus seen that the algino-gum product in its reactiveness to metal compounds behaves entirely differently from either algin by itself or gum by itself, which fact constitutes further evidence that the algino-gum product is a new compound and which fact also indicates the water-insoluble metalorganic compounds of algino-gum are also new compounds.

While this invention has been described in connection with certain illustrations of the practice thereof, it is to be understood that this has been done for the purpose of exemplification and that the practice of this invention may be varied within the scope thereof as defined by the language of the following claims.

I claim:

1. A method which comprises preparing a coagulum of algin in an acidic aqueous medium at a pH below the isoelectric point of the algin, commingling said acidic coagulum of algin with water-dissolved water-soluble alcohol-insoluble vegetable gum while maintaining the pH of the aqueous medium containing said so-commingled algin coagulum and dissolved vegetable gum at a pH below the isoelectric point of the algin, and the reaction of said algin coagulum and said dissolved vegetable gum commingled in said aqueous medium at a pH below the isoelectric point of the algin to form an algino-gum product of interaction between said algin and said gum.

2. The algino-gum reaction product produced in accordance with the method of claim 1.

3. The method according to claim 1 wherein the said algino-gum reaction product after the formation thereof as recited in claim 1 is thereafter dehydrated to produce it in a dry condition.

4. The dried algino-gum reaction product produced in accordance with the method of claim 3, said product being readily dispersible in and soluble in water.

5. A method according to claim 1 wherein the acidic medium in which said algino-gum reaction product is formed is deacidified after the formation of said reaction product and while said reaction product is contained therein from a pH below the isoelectric point of the algin to a pH of at least about 4.5.

6. The algino-gum reaction product produced in accordance with the method of claim 5.

7. A method according to claim 1 wherein the water-soluble alcohol-insoluble vegetable gum is Irish moss.

8. The algino-gum reaction product produced in accordance with the method of claim 7.

9. A method which comprises preparing a coagulum of algin in an acidic aqueous medium at a pH below the isoelectric point of the algin, commingling said acidic coagulum of algin with water-dissolved water-insoluble alcohol-insoluble vegetable gum while maintaining the pH of the aqueous medium containing the so-commingled algin coagulum and dissolved vegetable gum at a pH below the isoelectric point of the algin, the reaction of said algin coagulum and said dissolved vegetable gum commingled in said aqueous medium at a pH below the isoelectric point of the algin to form an algino-gum product of interaction of said algin and said gum, and thereafter coagulating the so-formed algino-gum reaction product by means of a water-miscible alcohol and separating the coagulated algino-gum reaction product from the alcoholic medium.

10. A method according to claim 9 wherein the coagulated algino-gum reaction product formed as aforesaid according to claim 9 is washed with water-miscible alcohol to remove water and contaminating substances soluble in the alcoholic medium and thereafter is dried.

11. A method according to claim 9 wherein after the formation of said algino-gum reaction product and before the said coagulation thereof by means of the water-miscible alcohol, said acid medium is deacidified while said reaction product is contained therein from a pH below the isoelectric point of the algin to a pH of at least about 4.5.

12. A method according to claim 9 wherein, after the formation of said algino-gum reaction product as recited in said claim, said coagulation thereof is effected by directing the algino-gum reaction product in dissolved condition through an orifice in filamentary form into an alcoholic bath to coagulate said algino-gum reaction product in filamentary form, the resulting filamentary coagulated algino-gum reaction product is separated from the alcoholic bath and thereafter is dried at subatmospheric pressure.

13. A method which comprises preparing a coagulum of algin in an acidic aqueous medium at a pH below the isoelectric point of the algin, commingling said acidic coagulum of algin with water-dissolved water-soluble alcohol-insoluble vegetable gum while maintaining the pH of the aqueous medium containing the so-commingled algin coagulum and dissolved vegetable gum at a pH below the isoelectric point of the algin, the reaction of said algin coagulum and said dissolved vegetable gum commingled in said aqueous medium at a pH below the isoelectric point of the algin to form an algino-gum product of interaction between said algin and said gum, and thereafter converting the so-formed algino-gum reaction product to a water-insoluble metalorganic compound by reacting said algino-gum reaction product with an ionizable compound of an insolubilizing metal in an aqueous medium.

14. The water-insoluble metalorganic compound produced in accordance with the method of claim 13.

15. A method according to claim 13 wherein the said algino-gum reaction product is formed into a filament and thereafter is converted in situ as disposed in said filamentary form to said water-insoluble metalorganic compound by said reaction with an ionizable compound of an insolubilizing metal in an aqueous medium.

16. As a new product, the said water-insoluble metal organic compound in the form of a filament produced in accordance with the method of claim 15.

17. A method according to claim 13 wherein said algino-gum reaction product is formed into a film and thereafter is converted in situ as disposed in said film form to said water-insoluble metalorganic compound by said reaction with an ionizable compound of an insolubilizing metal in an aqueous medium.

18. As a new product, the said water-insoluble metalorganic compound in the form of a film produced in accordance with the method of claim 17.

19. A method according to claim 13 wherein the said algino-gum reaction product is applied to a fabric and thereafter is converted in situ as applied to said fabric to said water-insoluble metalorganic compound by said reaction with an ionizable compound of an insolubilizing metal in an aqueous medium.

20. As a new product, a fabric having applied thereto a water-insoluble metalorganic compound produced in accordance with the method of claim 19.

21. A method according to claim 13 wherein after the formation of said algino-gum reaction product and before the conversion thereof to said water-insoluble metalorganic compound, said acidic medium is deacidified while said reaction product is contained therein from a pH below the isoelectric point of the algin to a pH of at least about 4.5, said algino-gum reaction product is thereafter disposed in a predetermined form, and is converted in situ as disposed in said predetermined form to said water-insoluble metalorganic compound by said reaction with an ionizable compound of an insolubilizing metal in an aqueous medium.

22. The water-insoluble metalorganic compound produced in predetermined filamentary form according to claim 21.

23. The water-insoluble metalorganic compound produced in predetermined film form according to claim 21.

VICTOR CHARLES EMILE LE GLOAHEC.

REFERENCES CITED

The following references are of record in the file of this patent:

UNITED STATES PATENTS

| Number | Name | Date |
|---|---|---|
| 2,007,721 | Lindstaedt | July 9, 1935 |
| 2,030,566 | Bonniksen | Feb. 11, 1936 |
| 2,060,336 | Near et al. | Nov. 10, 1936 |
| 2,158,487 | Preble | May 16, 1939 |
| 2,290,633 | Cate | July 21, 1942 |
| 2,317,492 | Speakman et al. | Apr. 27, 1943 |

OTHER REFERENCES

Silk J. & Rayon World, September 20, 1935, pp. 30, 18–54.

Rayon Textile Monthly, November 1942, pp. 85 and 86 (Copy in 18–54 A.)